Aug. 14, 1945.  M. WATTER  2,382,356
METHOD OF APPLYING METALLIC SKINS TO METALLIC STRUCTURES
Filed June 18, 1941  2 Sheets-Sheet 1
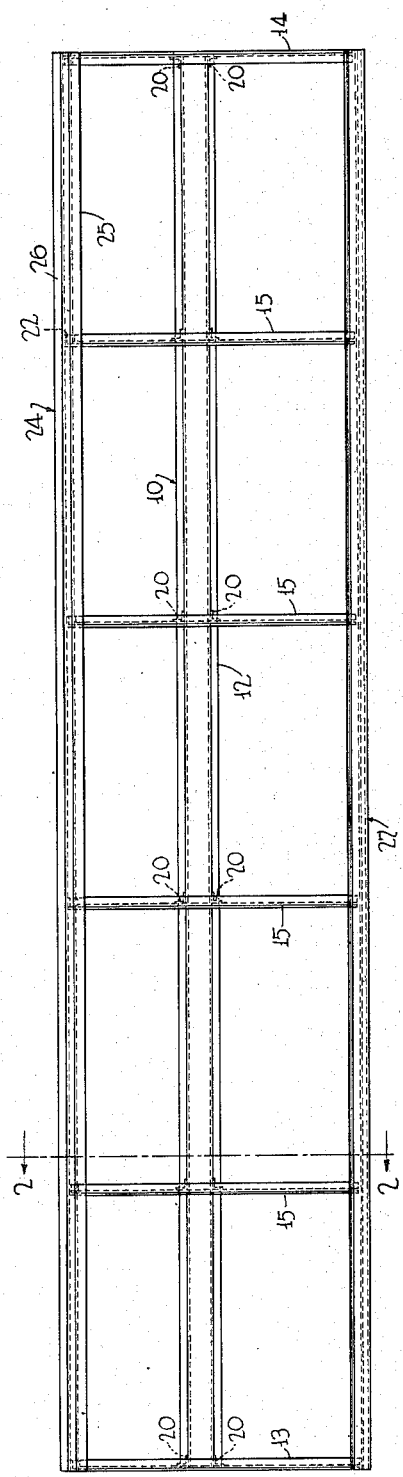
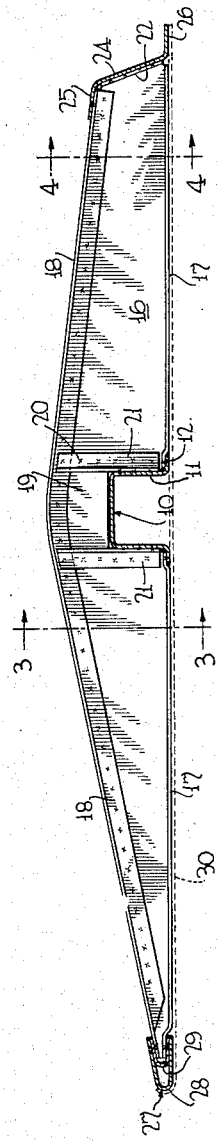
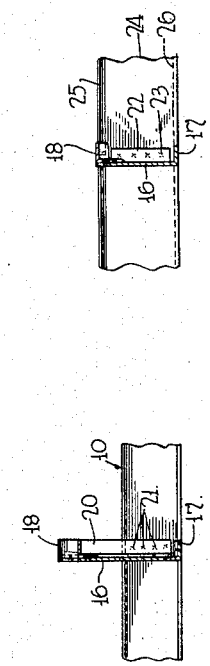
INVENTOR
Michael Watter
BY John P. Tarbox
ATTORNEY Aug. 14, 1945.  M. WATTER  2,382,356
METHOD OF APPLYING METALLIC SKINS TO METALLIC STRUCTURES
Filed June 18, 1941  2 Sheets-Sheet 2
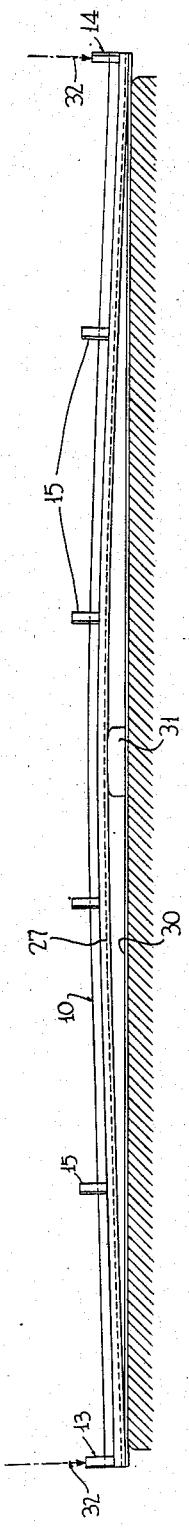
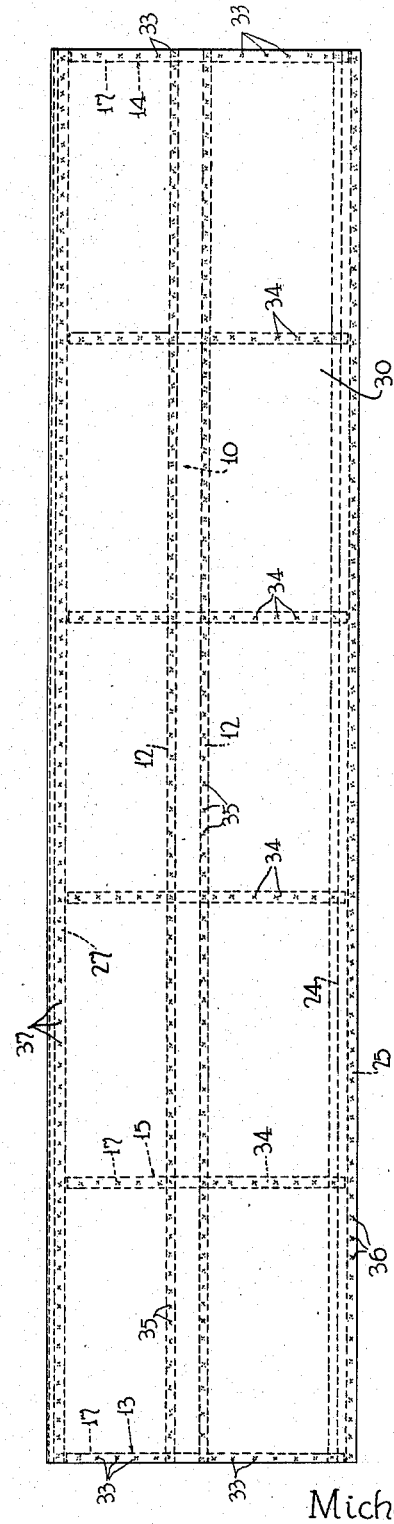
INVENTOR
Michael Watter.
BY John P. Tarbox
ATTORNEY Patented Aug. 14, 1945

2,382,356

UNITED STATES PATENT OFFICE 2,382,356

METHOD OF APPLYING METALLIC SKINS TO METALLIC STRUCTURES

Michael Watter, Philadelphia, Pa., assignor to Edward G. Budd Manufacturing Company, Philadelphia, Pa., a corporation of Pennsylvania Application June 18, 1941, Serial No. 398,599

3 Claims. (Cl. 29—148.2)

This invention relates to aircraft structures and other devices and more particularly to a new and improved method of applying a relatively thin metallic skin to a metal framework.

It is desirable, in aircraft in particular, to have the skin coverings of wing flaps, ailerons and other parts or control surfaces exposed to the flow of air as smooth as possible in order to minimize air resistance. This is a simple matter in the case of fabric covered structures because in such structures the fabric is applied and doped with suitable materials which cause the fabric to shrink between its points of securement and become tensioned in all directions to thereby preclude the formation of wrinkles.

In the case of present day structures, however, in employing skin coverings of relatively thin sheet metal such as, for example, stainless steel, aluminum and Duralumin, the problem of tensioning the skin to preclude the formation of wrinkles is not so simple. Accordingly, one of the objects of the present invention is to provide a new and improved method of applying and tensioning skin coverings of sheet metal, the use of which is simple and economical.

Another object is to provide an improved method of tensioning a metallic skin sheet which is particularly applicable for use in connection with light frame structures which are susceptible of being bent or distorted intermediate their ends.

With the above and other objects in view it will be apparent to those skilled in the art to which the present invention appertains, the present invention consists in various steps and combinations of steps in the method to be hereinafter described with reference to the acompanying drawings and then claimed.

In the drawings, which illustrate one application of the present invention:

Figure 1 is a top plan view of the frame structure, such as may be employed in a wing flap, to one side of which a metallic skin sheet is to be secured;

Figure 2 is a transverse section taken substantially on line 2—2 of Figure 1;

Figure 3 is a section taken substantially on the line 3—3 of Figure 2;

Figure 4 is a section taken substantially on the line 4—4 of Figure 2;

Figure 5 is a side elevation of the frame structure, showing one step in the process of securing a skin sheet thereto; and Figure 6 is a bottom plan view of the completed structure.

Referring to the accompanying drawings in which like numerals refer to like parts throughout the several views, the frame structure selected for use in illustrating the present invention is of the character suitable for use as an aircraft wing flap, but it is to be understood, however, that the invention is not limited to use in connection with the specific frame structure illustrated.

The frame structure shown in Figures 1 to 4 is formed of thin-gauge sheet metal parts and embodies a central longitudinally extending member 10, the side flanges 11 of which are provided with outwardly extending marginal flanges 12.

The frame structure also embodies end cross members 13 and 14 and intermediate cross members 15. Each of these cross members embodies a flat metal sheet 16 having a flange 17 at its lower edge and an angle member 18 spot welded to its upper edge, which edge as shown in Figure 2 at each side of its central part slopes downwardly toward the lower edge.

The cross members 13, 14 and 15 are notched out as shown at 19 in Figure 2 at their lower edges to receive the inverted channel member 10. Spaced angle members 20 spot welded to the plates or sheets 16 are also welded to the channel flanges 11 as shown at 21 in Figure 3.

The sheets 16 of the cross members are provided at the right end, as viewed in Figure 2 and as shown in Figure 4, with a flange 22 which is spot welded as indicated at 23 to a longitudinally extending side member 24, having a flange 25 at its uper edge which is spot welded to the angle members 18 and a flange 26 at its lower edge reversely bent with respect to the upper flange 25.

The opposite edge of the frame structure is reinforced by a side member 27 comprised of a pair of nested channels 28 and 29 which are spot welded to the ends of the flanges 17 and the angle members 18.

The metal skin sheet 30 to be attached to the frame structure is supported in the flat and a block or fulcrum member 31 is disposed crosswise of the sheet intermediate its ends as shown in Figure 5. The frame structure is disposed upon the fulcrum member 31 and the ends thereof are then forced downwardly into engagement with the ends of the skin sheet 30, thus bending or distoring the frame structure as shown in Figure 5 which results in placing the side thereof toward the skin sheet in compression, the arrows 32 representing the application of pressure to the ends of the frame structure.

The ends of the skin sheet 30 are then spot welded to the flanges 17 of the endmost cross members 13 and 14 as indicated at 33. The fulcrum member 31 is next removed from between the skin sheet 30 and the frame structure, and the frame structure is then forced from its arch-like formation over the skin sheet back to its original position, thus bringing the flanges 17 of the intermediate cross members 15 into engagement with the skin sheet. The spot welding operation is then completed. This includes spot welding of the skin sheet 30 to the flanges 17 of the intermediate cross members 15 and the flanges 12 of the central longitudinal member 10, to the flange 26 of the longitudinal member 24 and to the nested channels 28 and 29 as indicated at 34, 35, 36 and 37 respectively.

It is obvious that, during the forcing of the frame structure from its arch-like formation back to its original undistorted or unbent shape, the longitudinal relative movement of the ends thereof increases the distance between the endmost cross members 13 and 14, thereby causing the skin sheet 30 to stretch and be placed under longitudinal tension to remove all wrinkles or waviness therefrom. Also, by spot welding the skin sheet 30 while it is under such tension to the remainder of the frame structure it is relieved of the wrinkles which frequently result in the thinner gauges of metal from the stresses set up during the cooling after the spot welding operation.

While the present invention has been described in connection with spot welding a specific framing structure, it is to be specifically understood that it is also applicable to other types of structures and to the use of rivets as a securing means.

What is claimed is:

1. In the art of making sheet metal fluid-foil covered frame structures for aircraft and the like, the method of applying a continuous sheet metal skin sheet to a distortable framework which consists in applying force to the framework to distort the same transversely beyond its normal condition and between spaced points thereon until the rectilinear distance between the spaced points is changed substantially, then, while the framework is in such distorted condition, securing a skin sheet to the compression side thereof at said spaced points with the extent of skin sheet between said spaced points in substantially taut condition but free of appreciable tension stress, and thereupon restoring the framework from such distorted condition toward its normal condition and bringing the skin sheet thereagainst along its length between said spaced points, whereby the extent of skin sheet between said spaced points is placed under appreciable tension stress.

2. In the art of making sheet metal fluid-foil covered frame structures for aircraft and the like, the method of applying a continuous sheet metal skin sheet to a distortable framework which consists in applying force to the framework to distort the same transversely beyond its normal condition and between spaced points thereon until the rectilinear distance between the spaced points is changed substantially, then, while the framework is in such distorted condition, securing a skin sheet to the compression side thereof at said spaced points with the extent of skin sheet between said spaced points in substantially taut condition but free of appreciable tension stress, thereupon restoring the framework from such distorted condition toward its normal condition whereby the extent of skin sheet between said spaced points is placed under appreciable tension stress, and finally securing the skin sheet and framework together in their extent between said spaced points.

3. In the art of making sheet metal fluid-foil covered frame structures for aircraft and the like, the method of applying a continuous sheet metal skin sheet to a distortable framework which consists in disposing the framework and skin sheet in adjacent spaced relation, then moving the ends of the framework into engagement with the skin sheet while maintaining the portion of the framework intermediate said ends spaced from the skin sheet, and while maintaining the skin sheet in the flat securing said ends to the skin sheet, and thereupon moving the intermediate portion of the framework into engagement with the skin sheet and in such movement increasing the distance between said ends and thereby tension-stressing the intervening portion of the skin sheet.

MICHAEL WATTER.